(12) United States Patent
Palin et al.

(10) Patent No.: US 9,119,201 B2
(45) Date of Patent: Aug. 25, 2015

(54) METHOD AND APPARATUS FOR SIGNAL STRENGTH BASED CONNECTION PARAMETERS ADJUSTMENT

(71) Applicant: Nokia Technologies Oy, Espoo (FI)

(72) Inventors: Arto Tapio Palin, Viiala (FI); Jukka Pekka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 69 days.

(21) Appl. No.: 13/875,788

(22) Filed: May 2, 2013

(65) Prior Publication Data

US 2014/0329465 A1 Nov. 6, 2014

(51) Int. Cl.
*H04B 7/00* (2006.01)
*H04W 76/04* (2009.01)
*H04W 76/02* (2009.01)

(52) U.S. Cl.
CPC .......... *H04W 76/043* (2013.01); *H04W 76/023* (2013.01)

(58) Field of Classification Search
USPC .............. 455/41.1, 41.2, 456.1, 456.3, 456.6, 455/67.11, 67.13, 522, 68, 69
See application file for complete search history.

(56) References Cited

U.S. PATENT DOCUMENTS

| | | | | |
|---|---|---|---|---|
| 7,697,516 B2* | 4/2010 | Frei et al. | ...................... | 370/389 |
| 2002/0132585 A1* | 9/2002 | Palermo et al. | ................ | 455/41 |
| 2005/0135310 A1* | 6/2005 | Cromer et al. | ................ | 370/331 |
| 2013/0229930 A1* | 9/2013 | Akay et al. | ..................... | 370/252 |
| 2013/0331127 A1* | 12/2013 | Sabatelli et al. | ........... | 455/456.3 |
| 2014/0188989 A1* | 7/2014 | Stekkelpak et al. | .......... | 709/204 |

OTHER PUBLICATIONS

Bluetooth; Master Table of Contents & Compliance Requirements; Specification of the Bluetooth System; Covered Core Package version: 4.0; Current Master TOC; Publication Date Jun. 30, 2010; Excerpts—[vol. 0] pp. 2-4; [vol. 1] pp. 78-80; [vol. 2] pp. 180-183, 835-837, 934; [vol. 3] pp. 76-78; [vol. 6] pp. 68-81.

* cited by examiner

*Primary Examiner* — Tuan A Tran
(74) *Attorney, Agent, or Firm* — Alston & Bird LLP (57) ABSTRACT

A method, apparatus and computer program product are disclosed to allow for proximity detection in a manner that advantageously balances power consumption and latency. In the context of a method, the presence of a communication device is detected and a wireless link is caused to be established to provide a connection, such as a session description protocol (SDP) connection, with the communication device. The method may also detect the proximity of the communication device based upon signal strength of one or more signals communicated via the established wireless link. The method may also adjust one or more connection parameters of the established wireless link based at least upon the signal strength of the one or more signals communicated via the link. A corresponding apparatus and computer program product are also disclosed.

17 Claims, 6 Drawing Sheets

METHOD AND APPARATUS FOR SIGNAL STRENGTH BASED CONNECTION PARAMETERS ADJUSTMENT

TECHNOLOGICAL FIELD

An example embodiment of the present invention relates generally to proximity detection and, more particularly, adjusting one or more connection parameters of a link based upon signal strength.

BACKGROUND

Device interaction may be based upon proximity detection in which the presence of a communication device is initially determined and the proximity of the communication device is then tracked. In some instances, proximity detection may be accomplished in a seamless manner without user interaction or dependence upon application status.

Figure 1:
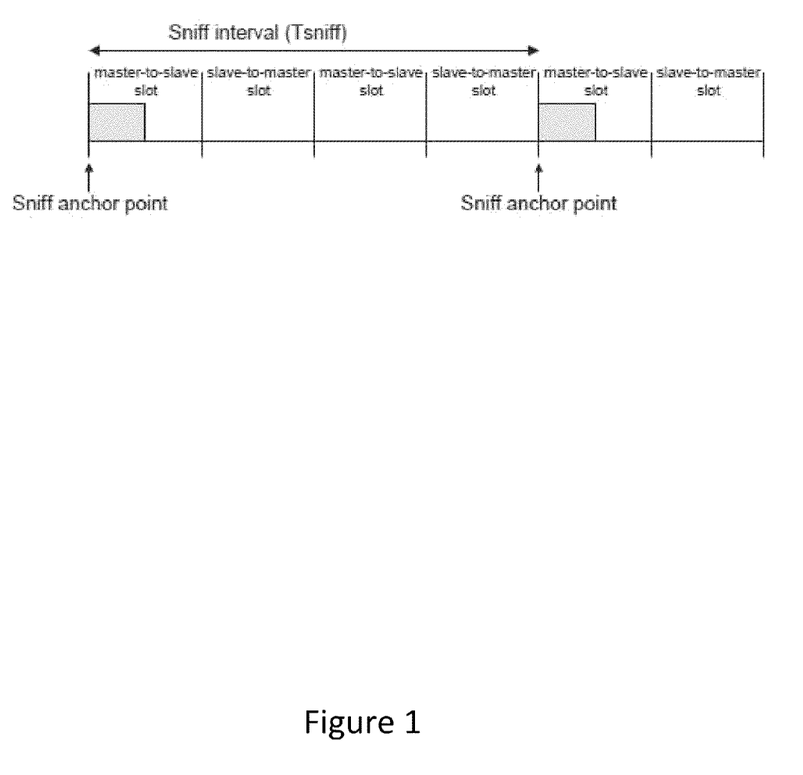
FIG. 1 is a graphical representation of a plurality of slots defined in the sniff mode and illustrating a plurality of sniff anchor points and the sniff interval therebetween.

Following the identification of the presence of a communication device, subsequent tracking of the proximity of the communication device would advantageously consume relatively low amounts of power and have relatively low latency in regard to the proximity detection. In order to reduce power consumption or to allow activity to be supported on another physical channel in instances in which device interaction is supported by Bluetooth, a Bluetooth basic rate (BR)/enhanced data rate (EDR) link that is established between a pair of communication devices may be configured to operate in a sniff mode. In the sniff mode, one of the communication devices is designated the master and the other communication device is designated the slave with the duty cycle and the slave's activity in the piconet being reduced. In an instance in which the slave device is in an active mode on an asynchronous connectionless (ACL) logical transport, the slave device may listen in every ACL slot for signals from the master device unless the link is treated as a scatternet link or as absent due to hold mode. In the sniff mode, however, the time slots in which a slave device listens for signals from the master device are reduced, since the master device shall only transmit signals to the slave device in specified time slots. As shown in FIG. 1, and as described by the Bluetooth specification version 4.0, the sniff mode may define a plurality of sniff anchor points at which the master device may commence transmission of signals to the slave device. The sniff anchor points may be spaced regularly with an interval of Tsniff. In an instance in which sniff sub-rating is enabled by the link manager, the communication devices may alternate between sniff mode and sniff sub-rating mode, with the sniff sub-rating mode allowing a communication device to utilize a reduced number of anchor points.

While the sniff mode reduces the power consumption required for proximity detection, sniff mode increases latency associated with proximity detection. Conversely, the latency associated with proximity detection may be reduced by more frequently or even continuously tracking the communication device, but at the expense of increased power consumption.

BRIEF SUMMARY

A method, apparatus and computer program product are provided in accordance with an example embodiment in order to provide for proximity detection in a manner that advantageously balances power consumption and latency. In one embodiment, the method, apparatus and computer program product may adjust a connection parameter, such as Tsniff, based upon the signal strength of signals communicated via a link between the proximate communication devices. As such, the method, apparatus and computer program product of an example embodiment may reduce the latency associated with the proximity detection of the expense of power consumption in instances in which the communication devices are closer together and more likely to interact. Conversely, the method, apparatus and computer program product of an example embodiment may reduce the power consumption at the expense of increased latency in instances in which the communication devices are spaced further apart from one another and less likely to interact.

In one embodiment, a method is provided that includes detecting, by an apparatus, the presence of a communication device and causing, by the apparatus, establishment of a wireless link providing a connection, such as a session description protocol (SDP) connection, with the communication device. The method of this embodiment also detects, by the apparatus, the proximity of the communication device based upon signal strength of one or more signals communicated via the established wireless link. The method of this embodiment also adjusts, by the apparatus, one or more connection parameters of the established wireless link based at least upon the signal strength of the one or more signals communicated via the link.

The one or more connection parameters may define an interval at which data is to be communicated via the link. In this embodiment, the method may adjust the one or more connection parameters by adjusting the interval at which data is to be communicated via the established wireless link. For example, the interval may be adjusted by increasing the interval in an instance in which the signal strength decreases, and decreasing the interval in an instance in which the signal strength increases. The method of one embodiment may also include determining the signal strength of one or more signals communicated via the established wireless link. For example, the method may determine the signal strength based upon a received signal strength indicator (RSSI). In one embodiment, the method may determine the signal strength by determining an average signal strength of a plurality of signals communicated via the established wireless link.

In another embodiment, an apparatus is provided that includes at least one processor and at least one memory, including computer program code, with the at least one memory and the computer program code configured to, with the processor, cause the apparatus to at least detect the presence of a communication device and to cause establishment of a wireless link providing a connection, such as a session description protocol (SDP) connection, with the communication device. The at least one memory and the computer program code are also configured to, with the processor, cause the apparatus of this embodiment to detect the proximity of the communication device based upon signal strength of one or more signals communicated via the established wireless link. The at least one memory and the computer program code are also configured to, with the processor, cause the apparatus of this embodiment to adjust one or more connection parameters of the established wireless link based at least upon the signal strength of the one or more signals communicated via the link.

The one or more connection parameters may define an interval at which data is to be communicated via the link. In this embodiment, the at least one memory and the computer program code may be configured to, with the processor, cause the apparatus to adjust the one or more connection parameters by adjusting the interval at which the data is to be communicated via the established wireless link. For example, the interval may be adjusted by increasing the interval in an instance in which the signal strength decreases, and decreasing the interval in an instance in which the signal strength increases. The at least one memory and the computer program code may be further configured to, with the processor, cause the apparatus of an example embodiment to determine the signal strength of one or more signals communicated via the established wireless link, such as based upon a received signal strength indicator (RSSI). In an example embodiment, the at least one memory and computer program code may be configured to, with the processor, cause the apparatus to determine the signal strength by determining an average signal strength of a plurality of signals communicated via the established wireless link.

In a further embodiment, a computer program product is provided that includes at least one non-transitory computer-readable storage medium having computer-executable program code portions stored therein. The computer-executable program code portions include program code portions for detecting the presence of a communication device and causing establishment of a wireless link providing a connection, such as a session description protocol (SDP) connection. The computer-executable program code portions also include program code instructions for detecting the proximity of the communication device based upon signal strength of one or more signals communicated via the established wireless link. The computer-executable program code portions also include program code instructions for adjusting one or more connection parameters of the established wireless link based at least upon the signal strength of the one or more signals communicated via the link.

The one or more connection parameters may define an interval at which data is to be communicated via the link. In this example embodiment, the program code instructions for adjusting a respective connection parameter may include program code instructions for adjusting the interval at which data is to be communicated via the established wireless link. For example, the interval may be adjusted by increasing the interval in an instance in which the signal strength decreases and decreasing the interval in an instance in which the signal strength increases. The computer-executable program code portions of an example embodiment may also include program code instructions for determining the signal strength of one or more signals communicated via the established wireless link. For example, the program code instructions for determining the signal strength may include program code instructions for determining the signal strength based upon a received signal strength indicator (RSSI).

In yet another embodiment, an apparatus is provided that includes means for detecting the presence of a communication device and means for causing establishment of a wireless link providing a connection the communication device. The apparatus of this embodiment also includes means for detecting proximity of the communication device based upon signal strength of one or more signals communicated via the established wireless link. In this embodiment, the apparatus also includes means for adjusting one or more connection parameters of the established wireless link based at least upon a signal strength of the one or more signals communicated via the link.

BRIEF DESCRIPTION OF THE SEVERAL VIEWS OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Figure 2:
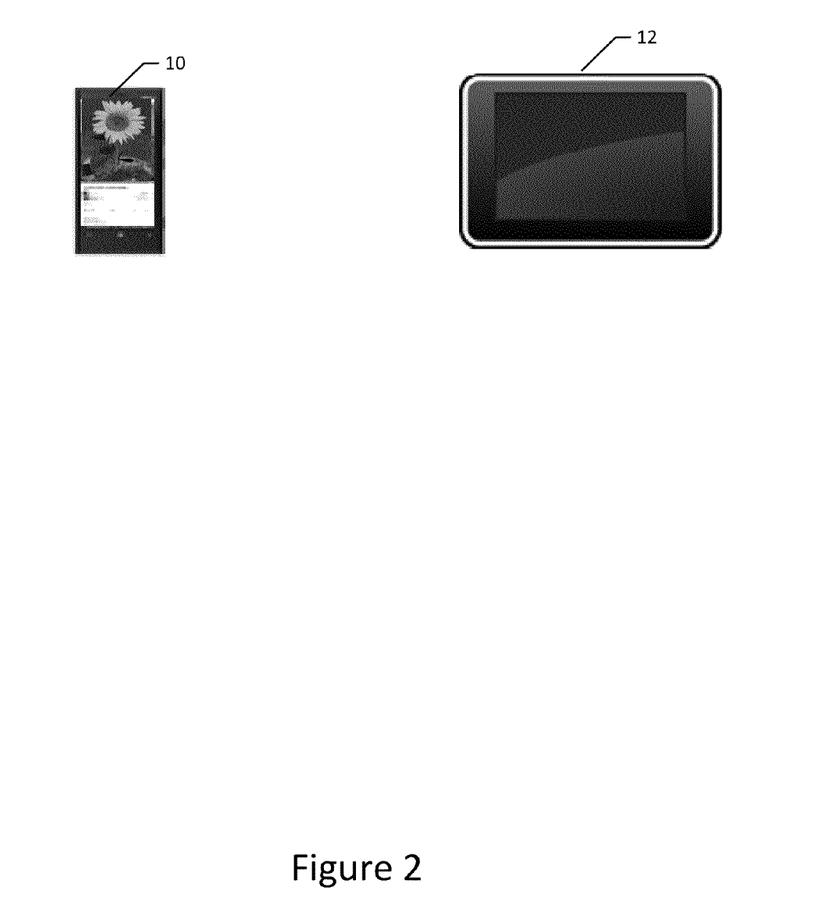
FIG. 2 is a schematic representation of a pair of communication devices in proximity to one another.

A method, apparatus and computer program product are provided in accordance with an example embodiment in order to detect the proximity of a communication device in a manner that balances issues relating to power consumption and latency. In this regard, two or more communication devices may be in the vicinity of one another and may be able to communicate directly with one another, such as in a wireless manner. In this regard, FIG. 2 depicts a pair of communication devices in the vicinity of one another and able to wirelessly communicate with one another, such as via a Bluetooth or other proximity based connection. Although FIG. 2 depicts a wireless connection established between a mobile telephone 10 and a tablet computer 12, the method, apparatus and computer program product of example embodiments may be configured to provide for proximity detection for a variety of different types of communication devices including, for example, including various types of mobile terminals, such as a portable digital assistant (PDA), mobile telephone, smartphone, pager, mobile television, gaming device, laptop computer, camera, tablet computer, headset, touch surface, video recorder, audio/video player, radio, electronic book, positioning device (e.g., global positioning system (GPS) device), or any combination of the aforementioned, and other types of voice and text communications systems. Additionally or alternatively, one communication devices may be embodied by a fixed computing device, such as a personal computer, a workstation or the like.

Figure 3:
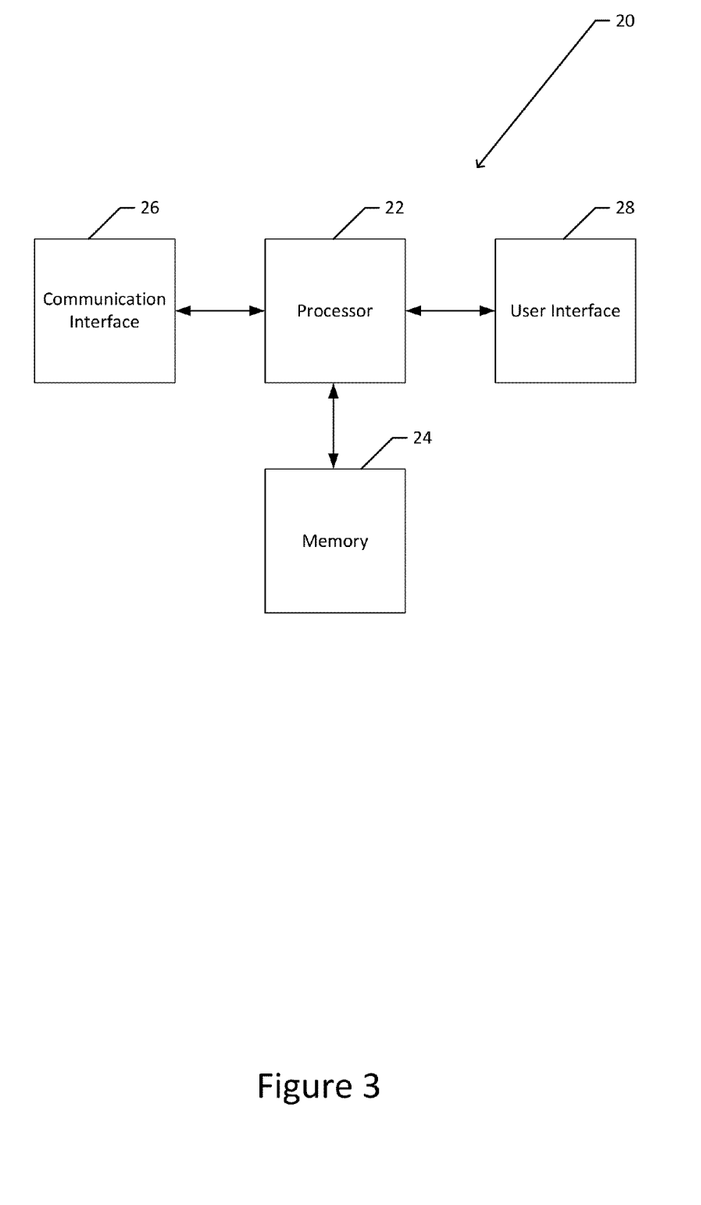
FIG. 3 is a block diagram of an apparatus that may be specifically configured in accordance with an example embodiment of the present invention.

Regardless of the type of communication device, one or both of the communication devices may include or otherwise be associated with an apparatus that is shown in FIG. 3 that is specifically configured in accordance with an example embodiment of the present invention to balance the power consumption and latency associated with proximity detection. The apparatus may include or otherwise be in communication with a processor 22, a memory device 24, a communication interface 26 and optionally a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a communications device, such as a mobile terminal or a fixed computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a communications device 10 in communication with the apparatus 20, such as to facilitate communications between the communications devices as shown in FIG. 1. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 20 may include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a speaker, or other input/output mechanisms. In one embodiment, the user interface includes the display upon which visual representation(s) of the audio characteristic(s) of the one or more audio files are presented. Alternatively or additionally, the processor may comprise user interface circuitry configured to control at least some functions of one or more user interface elements such as a display and, in some embodiments, a speaker, ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Figure 4:
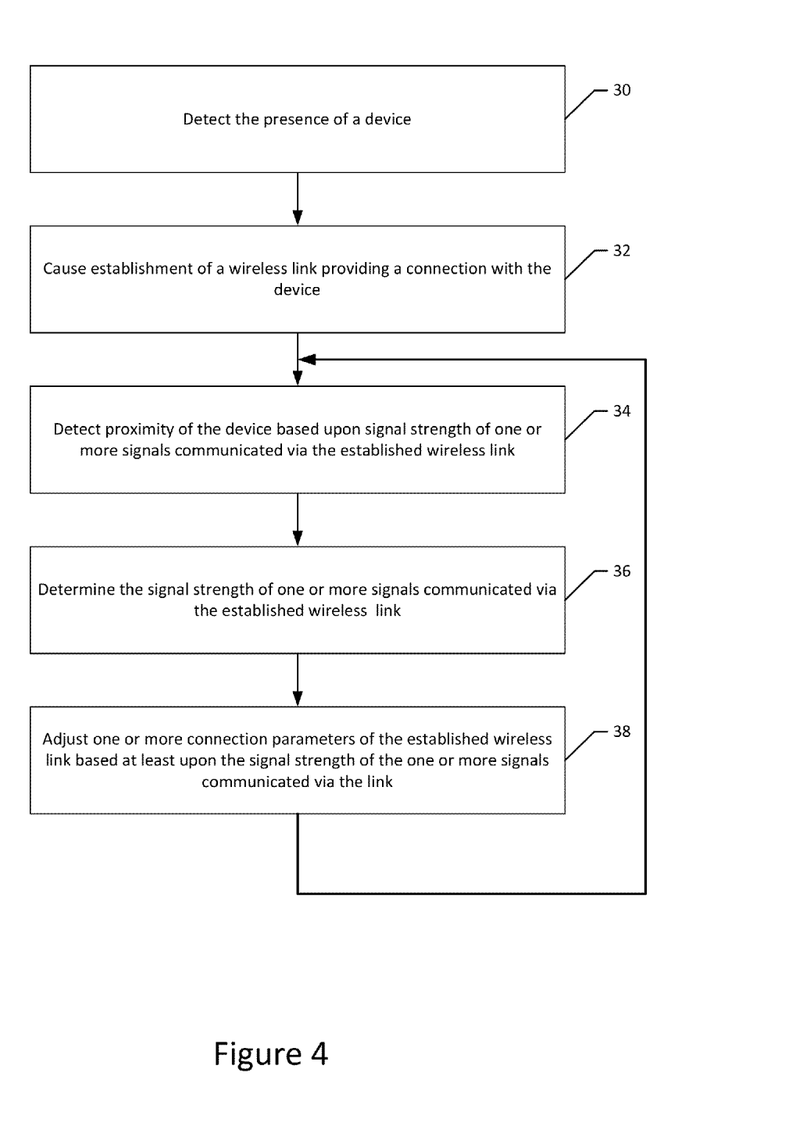
FIG. 4 is a flow chart illustrating operations performed, such as by the apparatus of FIG. 3, in accordance with an example embodiment o the present invention.

In order to provide for proximity detection between a pair of proximately located communication devices 10, 12, the operations performed, such as by the apparatus 20 of FIG. 3 embodied by or otherwise associated with a communications device, in accordance with an example embodiment are illustrated in FIG. 4. As set forth by block 30 of FIG. 3, the apparatus 20 may include means, such as the processor 22, the communication interface 26 or the like, for detecting the presence of a communication device. With respect to the example embodiment of FIG. 2, the mobile telephone 10 may include or otherwise be associated with the apparatus and, as such, may detect the presence of another communication device, such as a tablet computer 12, in an instance in which the other communication device is still relatively far away from the table computer so long as the other communication device is capable of establishing wireless communications with the tablet computer. The presence of another communication device maybe detected in various manners, but, in one embodiment, the apparatus, such as the processor, communication interface, or the like may cause one or more page messages to be transmitted. The page messages may be transmitted to one or more predefined communication devices, such as communication devices with which communication links has been previously established and for which the apparatus has maintained the addresses or communication devices for which the addresses have been obtained in other manners, such as near field communication (NFC) based out-of-band paging. In one embodiment, the page messages may be transmitted to the addresses, e.g., Bluetooth addresses, of the one or more predefined communication devices. One or more page messages may, in one example embodiment, be transmitted at a predefined interval, such as an interval of 30 seconds. In an instance in which a communication device responds to a page message, the presence of the communication device is detected by the apparatus.

As shown in block 32 of FIG. 4, once the presence of a communication device has been detected, the apparatus 20 may include means, such as the processor 22, communication interface 26 or the like, for causing establishment of a wireless link providing a connection with the communication device. Although a variety of different types of connections may be established, the apparatus, such as the processor, communication interface or the like, of one embodiment may establish a Session Description Protocol (SDP) connection with the communication device.

Figure 5:
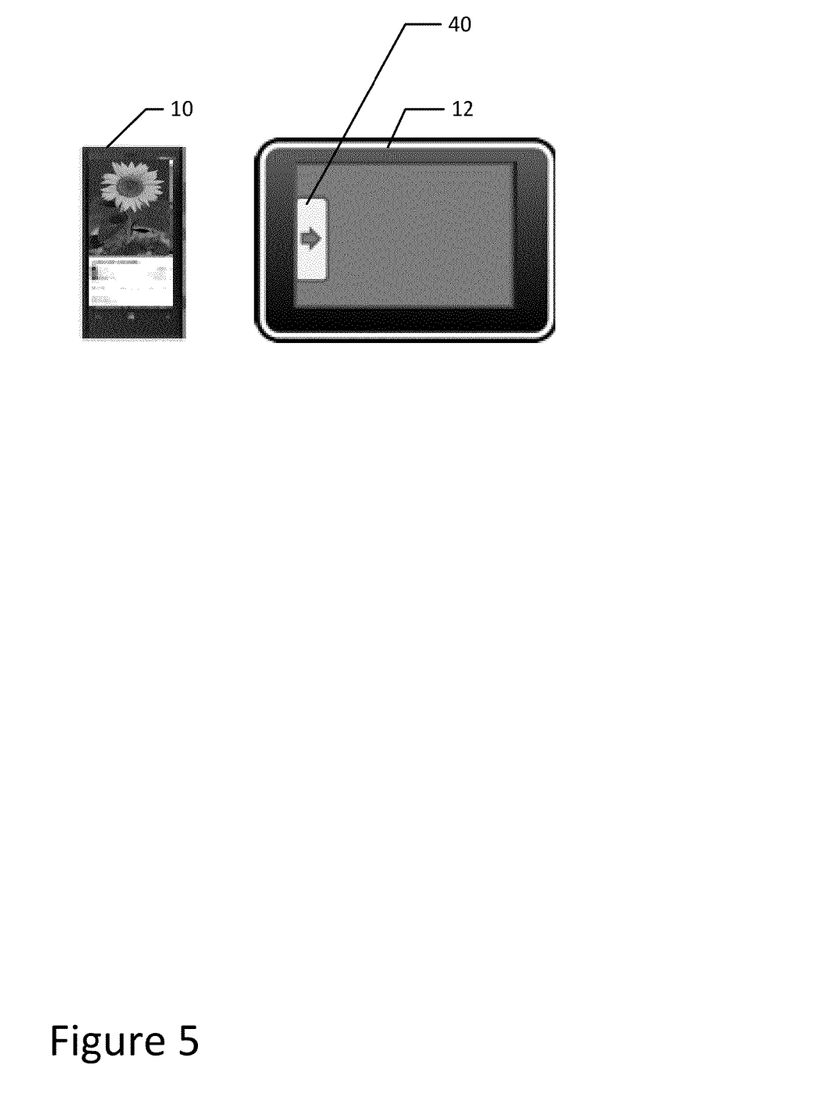
FIG. 5 is a schematic representation of the pair of communication devices depicted in FIG. 2 following movement of the communication devices into closer proximity to one another.
Figure 6:
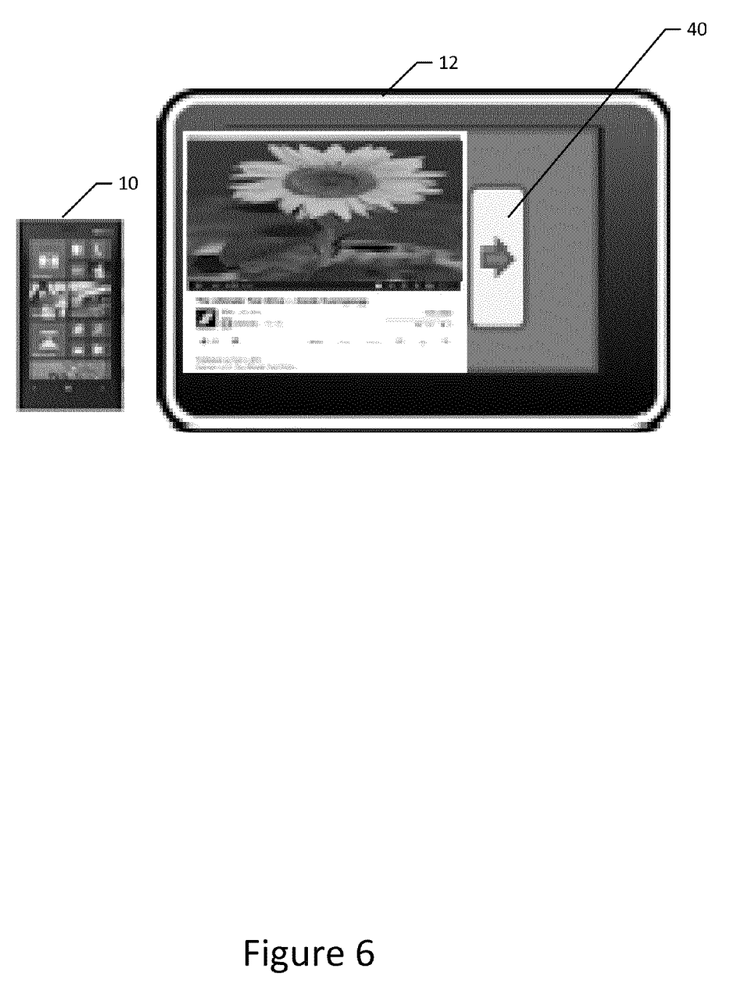
FIG. 6 is a schematic representation of the pair of communication devices depicted in FIGS. 2 and 5, illustrating collaboration between the communication devices.

The apparatus 20 may also include means, such as the processor 22, the communication interface 26 or the like, for detecting the proximity of the communication device based upon signal strength of one or more signals communicated via the established wireless link. See block 34 of FIG. 4. In this regard, the apparatus, such as the processor, the communication interface or the like, may determine or estimate the distance between the communication devices based upon the signal strength in order to determine or track the proximity of the communication devices. For example, decreases in the signal strength may indicate that the devices are moving further away from one another, while increases in the signal strength may indicate that the devices are moving toward one another. As described below, interaction between the communication devices is generally much more likely in an instance in which the communication devices are proximate, that is, very near one another as shown in FIGS. 5 and 6, than in an instance in which the communication devices are spaced further apart as shown in FIG. 2.

Additionally, the apparatus 20 may include means, such as the processor 22, the communications interface 26 or the like, for adjusting one or more connection parameters of the established wireless link based at least upon the signal strength of the one or more signals communicated via the link. See block 38 of FIG. 4. The connection parameters may define various aspects of the wireless link between the communication devices and the manner in which data is communicated via the link. For example, the connection parameters may define an interval at which that is to be communicated via the link. In this embodiment, the apparatus 20, such as the processor 22, the communication interface 26 or the like, may adjust the respective connection parameter by adjusting the interval at which data is to be communicated via the link. For example, the interval maybe adjusted by increasing the interval in an instance in which the signal strength decreases and decreasing the interval in an instance in which the signal strength increases. As such, the interval may be adjusted such that the interval varies in an inverse manner to the signal strength. As a decrease in the signal strength indicates that the communication devices are moving further away from one another and therefor are less likely to interact with one another, the interval maybe increased so as to reduce the power consumption associated with the detection of proximity. Even though the increase in the interval may correspondingly increase the latency associated with proximity detection, the moving of the communication devices away from one another indicates that it is unlikely that the communication devices will soon be close to one another so as to interact with one another such that the increased latency should not create an issue. Conversely, an increase in the signal strength may be indicative of movement of the communication devices closer to one another such that there is a greater likelihood of interaction between the communication devices. As such, the interval may be decreased in order to reduce the latency associated with proximity detection in light of the increase likelihood of interaction between the communication devices, albeit at the expense of an increase in power consumption.

As described above, the communication devices 10, 12 may communicate in various manners. In an example embodiment, however, the communication devices communicate via Bluetooth, such as Bluetooth BR/EDR. As such, the communication devices of one embodiment may implement the sniff mode so as to communicate in time slots separated by a sniff interval Tsniff and commencing at respective sniff anchor points as depicted in FIG. 1. In this example embodiment, the apparatus 20, such as the processor 22, the communication interface 26 or the like, may be configured to adjust a respective connection parameter by adjusting the sniff interval based upon the signal strength of one or more signals communicated via the link.

In an example embodiment, the connection parameters for a Bluetooth Low Energy (LE) connection, such as the link established between the communication devices in order to detect the proximity therebetween, may be initially established by a CONNECT_REQ packet data unit (PDU) that maybe transmitted to establish the connection. Subsequent communication between the communication devices, such as communication via the Bluetooth LE connection, may be conducted in connection events. Each connection event includes at least one packet that is transmitted by the master device. During the Bluetooth LE connection, one of the communication devices may be designated as the master device and the other communication device may be designated as the slave device. During a connection event, the master device and the slave device may alternate the transmission and reception of packets. A connection event may be considered to remain open while both communication devices continue to transmit packets. The timing of the connection events may be defined by two or more parameters including the connection event interval (connInterval) and the slave latency (connSlaveLatency). In this regard; an anchor point may define the beginning of a connection event. At the anchor point, a master device may begin to transmit a Data Channel PDU to the slave device. The anchor point may be spaced regularly at an interval of connInterval such that the connection events shall not overlap. Slave latency allows a slave device to utilize a reduced number of connection events. In this regard, the connSlaveLatency parameter defines the number of consecutive connection events that a slave device is not required to listen for the master device.

In this example embodiment, the connection parameters, such as the link layer parameters for a Bluetooth LE connection, e.g., connInterval, connSlaveLatency and connSupervisionTimeout (a parameter that defines the maximum time between two received data packet PDUs before the connection is considered to be lost), may be updated following entry into the connection state. For example, the master device may update the connection parameters by transmitting an LL_CONNECTION_UPDATE_REQ PDU. Although a slave device shall not send an LL_CONNECTION_UPDATE_REQ PDU, the slave device may request a change to the connection parameters using a L2CAP LE signaling channel with a CONNECTION PARAMETER UPDATE REQUEST. In response to the CONNECTION PARAMETER UPDATE REQUEST, the master device may respond with a CONNECTION PARAMETER UPDATE RESPONSE. Additionally, in a master device supporting a host/controller interface (HCI), the master device may also update the connection parameters with an LE Connection Update Command.

As such, in an embodiment in which the link established between the communication devices 10, 12 for proximity detection is a Bluetooth LE connection operating in accordance with a sniff mode, the apparatus 20, such as the processor 22, the communication interface 26 or the like, may alter one or more the connection parameters, such as the connInterval, in order to alter the spacing in between the anchor points based upon the signal strength of the signals communicated via the link.

As shown in block 36 of FIG. 4, the apparatus may also include means, such as the processor 22, the communications interface 26 or the like, for determining the signal strength of one or more signals communicated via the established wireless link. Although the signal strength may be defined in various manners, the apparatus, such as the processor, the communications interface or the like, of one embodiment may determine the signal strength based upon a received signal strength indicator (RSSI). As the signal strength may vary over time, such as due to fading even in an instance in which the communication devices are not moving relative to one another, the apparatus, such as the processor, the communications interface or the like, may determine an average signal strength of a plurality of signals communicated via the link.

As noted above, various connection parameters may be adjusted based upon the signal strength of the one or more signals communicated via the wireless link. In an example embodiment, the interval that which status is communicated via the established wireless link may be adjusted based upon the signal strength. Although the relationship between the interval and the signal strength may be defined in various manners including with an algorithm or a formula, a plurality of predefined ranges of signal strength may be defined with each range of signal strength having an associated interval. By way of example, a RSSI value of less than −80 dBm may be associated with a sniff interval of 5.12 seconds, a RSSI value between −80 dBm and −60 dBm may be associated with a sniff interval of 2.56 seconds and an RSSI value of greater than −60 dBm may be associated with a sniff interval of 1.28 seconds. As such, based upon the RSSI value that is determined, the apparatus, such as the processor, the communications interface or the like, may adjust the sniff interval to be that associated with the respective RSSI value. Although the foregoing mapping between various ranges of RSSI values and sniff intervals is provided by way of example, the method, apparatus, and computer program product may utilize any of a wide variety of other mappings or other manners for associating RSSI values and sniff intervals in other embodiments.

As noted above, interaction between the communication devices 10, 12 may be more likely in an instance in which the communication devices are proximate one another as shown in FIG. 5 than in an instance in which the communication devices are spaced quite some distance away from one another as shown in FIG. 2. In this regard, in an instance in which the communication devices are spaced quite some distance from one another as shown in FIG. 2, the method, apparatus and computer program product of an example embodiment may utilize a relatively long sniff interval to reduce power consumption at the expense of latency since it is unlikely that the communication devices will soon be close enough to one another to interact. Once the communication devices move close to one another as shown, for example, in FIG. 5, the method, apparatus and computer program product of an example embodiment may reduce the interval, e.g., Tsniff, at which signals are communicated via the link between the communication devices so as to reduce the latency associated with the proximity detection since the nearness of the communication devices makes it much more likely that the communication devices may interact, albeit at the expense of increased power consumption.

As an example of one type of interaction between the communication devices, one communication device, such as the tablet computer 12, may display a graphical indication 40, such as an arrow that may be actuated by a user in order to transfer an application or at least a display associated with an application from the mobile terminal 10 to the tablet computer which may provide a larger display. See FIG. 5. In this regard, FIG. 6 illustrates the transfer of the display of the application from the mobile terminal to the tablet computer following user actuation of the arrow, such as by the tapping of the arrow by the user or the dragging of the arrow to the right by the user. As such, the user may subsequently interact with the application via the tablet computer which may provide increased convenience as a result of the larger display.

As described above, FIG. 4 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. The computer program product may be embodied as an application that is configured to implement, for example, at least certain ones of the operations of the flowchart of FIG. 4.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   detecting, by an apparatus, a presence of a communication device;
   causing, by the apparatus, establishment of a wireless link providing a connection with the communication device;
   detecting, by the apparatus, proximity of the communication device based upon signal strength of one or more signals communicated via the established wireless link; and
   adjusting, with the apparatus, one or more connection parameters of the established wireless link based at least upon a signal strength of the one or more signals communicated via the link,
   wherein the one or more connection parameters define an interval at which data is to be communicated via the link, and wherein adjusting the one or more connection parameters comprises adjusting the interval at which data is to be communicated via the established wireless link.

2. A method according to claim 1 wherein adjusting the interval comprises increasing the interval in an instance in which the signal strength decreases and decreasing the interval in an instance in which the signal strength increases.

3. A method according to claim 1 further comprising determining the signal strength of one or more signals communicated via the established wireless link.

4. A method according to claim 3 wherein determining the signal strength comprises determining the signal strength based upon a received signal strength indicator (RSSI).

5. A method according to claim 3 wherein determining the signal strength comprises determining an average signal strength of a plurality of signals communicated via the established wireless link.

6. A method according to claim 1 wherein causing a link to be established comprises causing a session description protocol (SDP) connection to be established.

7. An apparatus comprising:
   at least one processor and at least one memory including computer program code, the at least one memory and the computer program code configured to, with the processor, cause the apparatus to at least:
   detect a presence of a communication device;
   cause establishment of a wireless link providing a connection with the communication device;
   detect proximity of the communication device based upon signal strength of one or more signals communicated via the established wireless link; and
   adjust one or more connection parameters of the established wireless link based at least upon a signal strength of the one or more signals communicated via the link,
   wherein the one or more connection parameters define an interval at which data is to be communicated via the link, and wherein the at least one memory and the computer program code are configured to, with the processor, cause the apparatus to adjust the one or more connection parameters by adjusting the interval at which data is to be communicated via the established wireless link.

8. An apparatus according to claim 7 wherein the at least one memory and the computer program code are configured to, with the processor, cause the apparatus to adjust the interval by increasing the interval in an instance in which the signal strength decreases and decreasing the interval in an instance in which the signal strength increases.

9. An apparatus according to claim 7 wherein the at least one memory and the computer program code are further configured to, with the processor, cause the apparatus to determine the signal strength of one or more signals communicated via the established wireless link.

10. An apparatus according to claim 9 wherein the at least one memory and the computer program code are configured to, with the processor, cause the apparatus to determine the signal strength by determining the signal strength based upon a received signal strength indicator (RSSI).

11. An apparatus according to claim 9 wherein the at least one memory and the computer program code are configured to, with the processor, cause the apparatus to determine the signal strength by determining an average signal strength of a plurality of signals communicated via the established wireless link.

12. An apparatus according to claim 7 wherein the at least one memory and the computer program code are configured to, with the processor, cause the apparatus to cause a link to be established by causing a session description protocol (SDP) connection to be established.

13. A computer program product comprising at least one non-transitory computer-readable storage medium having computer-executable program code portions stored therein, the computer-executable program code portions comprising program code instructions for:
   detecting a presence of a communication device;
   causing establishment of a wireless link providing a connection with the communication device;
   detecting proximity of the communication device based upon signal strength of one or more signals communicated via the established wireless link; and
   adjusting one or more connection parameters of the established wireless link based at least upon a signal strength of the one or more signals communicated via the link,
   wherein the one or more connection parameters define an interval at which data is to be communicated via the link, and wherein the program code instructions for adjusting the one or more connection parameters comprise program code instructions for adjusting the interval at which data is to be communicated via the established wireless link.

14. A computer program product according to claim 13 wherein the program code instructions for adjusting the interval comprise program code instructions for increasing the interval in an instance in which the signal strength decreases and program code instructions for decreasing the interval in an instance in which the signal strength increases.

15. A computer program product according to claim 13 wherein the computer-executable program code portions further comprise program code instructions for determining the signal strength of one or more signals communicated via the established wireless link.

16. A computer program product according to claim 15 wherein the program code instructions for determining the signal strength comprise program code instructions for determining the signal strength based upon a received signal strength indicator (RSSI).

17. A computer program product according to claim 13 wherein the program code instructions for causing a link to be established comprise program code instructions for causing a session description protocol (SDP) connection to be established.

* * * * *